Nov. 19, 1935.     J. W. BICKEL     2,021,166
CIRCUIT CONTROL MEANS
Filed March 6, 1935     2 Sheets-Sheet 1
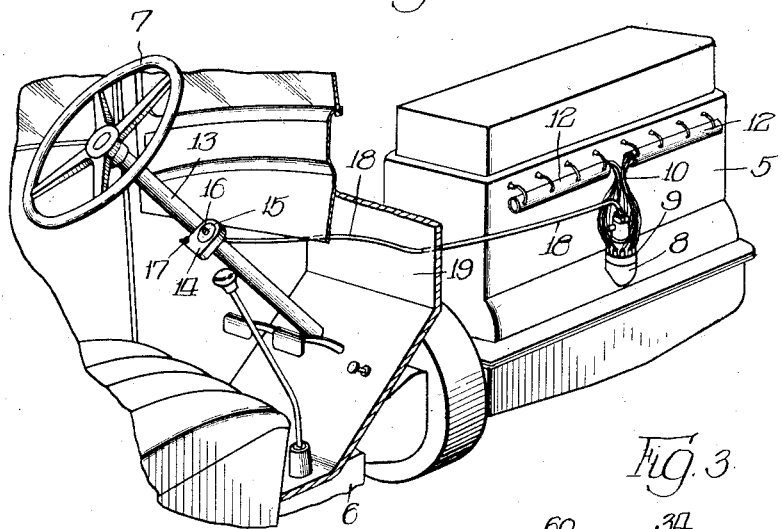
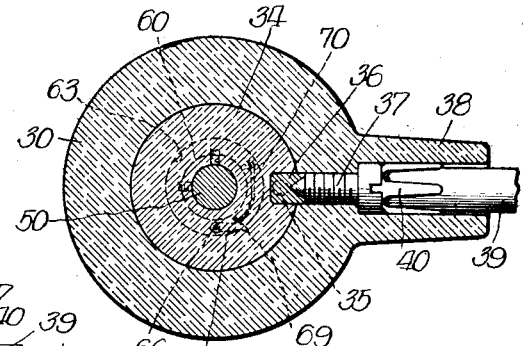
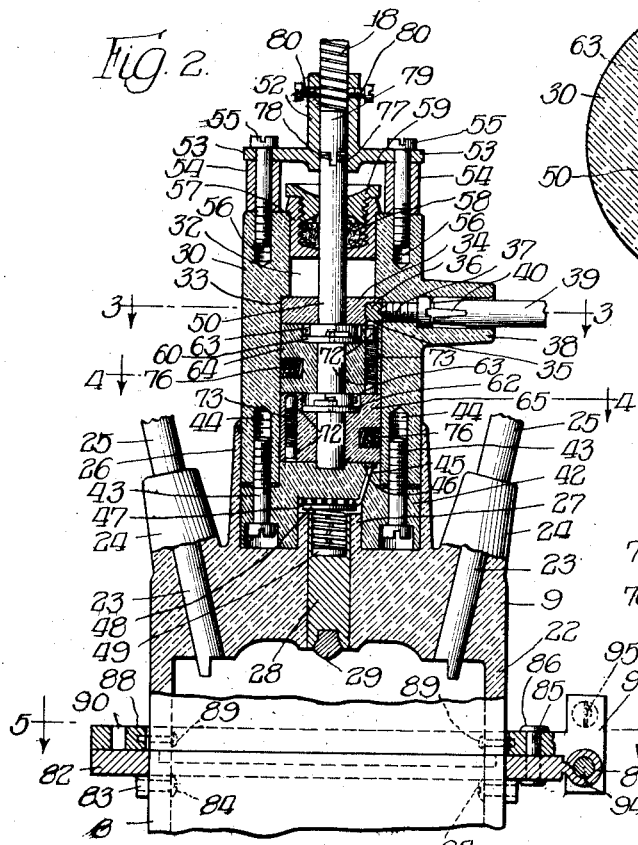
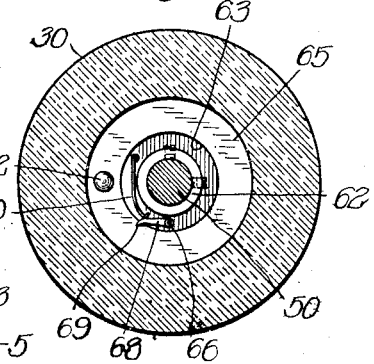
Inventor:
Joseph W. Bickel,
By Brown, Jackson, Boettcher & Dienner, Attys.

Nov. 19, 1935.  J. W. BICKEL  2,021,166
CIRCUIT CONTROL MEANS
Filed March 6, 1935    2 Sheets-Sheet 2
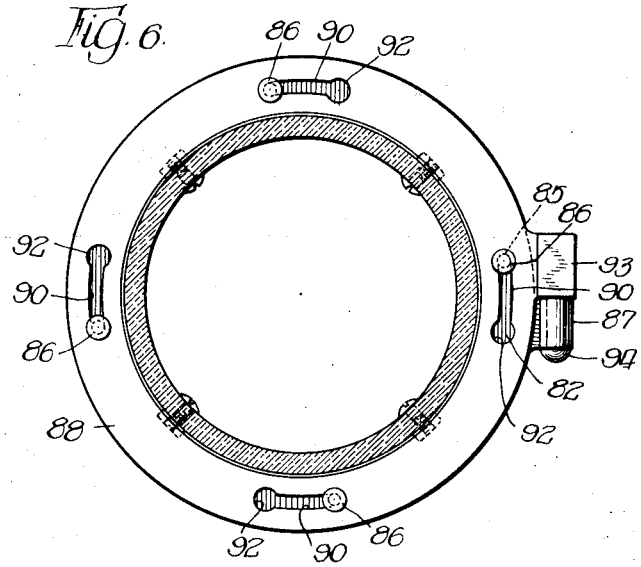
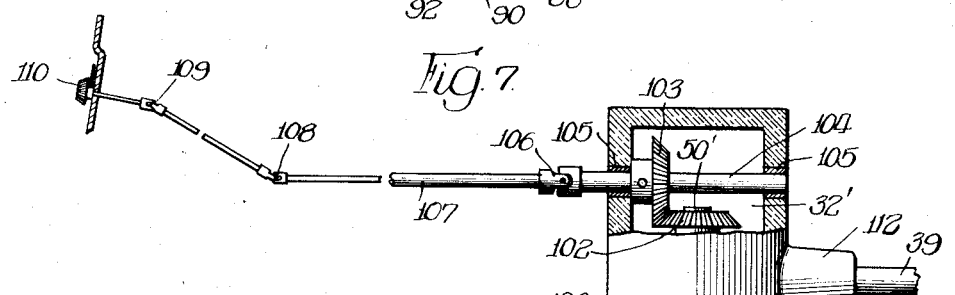
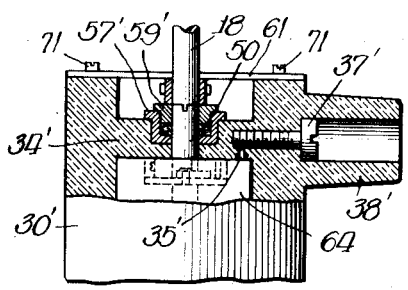
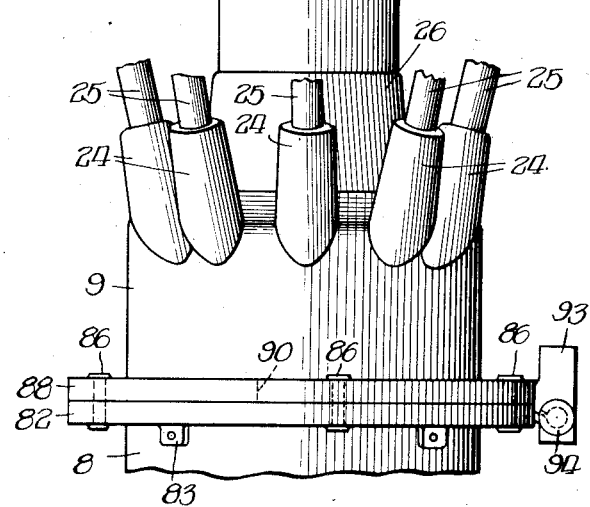
Inventor:
Joseph W. Bickel,
By Brown, Jackson, Boettcher & Dienner,
Attys Patented Nov. 19, 1935

2,021,166

UNITED STATES PATENT OFFICE 2,021,166

CIRCUIT CONTROL MEANS

Joseph W. Bickel, Niles Center, Ill.

Application March 6, 1935, Serial No. 9,610

4 Claims. (Cl. 200—19)

This invention relates to circuit control means, and more particularly is directed to circuit control means for use in connection with the ignition circuits of automotive vehicles and the like.

The present invention, in its preferred embodiment, is directed to the provision of means for preventing the unauthorized completion of the ignition circuit through the distributor of an automobile or the like, to thereby prevent operation of the vehicle by any one except the rightful owner.

One object of the present invention is to provide a circuit controlling locking mechanism interposed in the connection between the high tension conductor leading from the induction coil and the center contact of the rotatable distributor arm.

Another object of the present invention is the provision of remotely disposed operating means for actuating the circuit control means, in order to move it into a predetermined position for effecting closing of the ignition circuit, which preferably comprises a rotatable dialing mechanism similar to that used for a combination lock or the like. The operating means, when moved through a predetermined sequence or combination of movements, is adapted to position the circuit controlling means so as to effect completion of the ignition circuit for producing self-operation of the vehicle upon energization of the starting motor.

Still another object of the present invention is the provision of a distributor cap which is adapted to carry, as a part thereof, the circuit controlling means of the present invention, the cap itself being locked to the distributor housing so that it cannot be removed except by the authorized opening of a key-controlled lock, and if broken or pried off the distributor, will necessitate complete rewiring of the ignition system, thus precluding rapid or immediate theft of the vehicle.

Another advantage attained by the present invention is the provision of a locking mechanism capable of employing an infinite variety of combinations and sequences of movement to secure actuation thereof, whereby the same type of locking structure, with different actuating combinations, may be employed on any number of vehicles, each structure having an individual locking combination.

Another advantage secured by the present invention is the provision of a locking circuit control means of this type wherein no key or other instrumentality is necessary to the operation of the circuit controlling means, and the disadvantages inherent in key operated devices are thus eliminated.

It is to be understood that the present invention is equally applicable to circuit controlling means other than employed in the ignition circuits of vehicles, the primary concept of the invention residing in the provision of a suitably controlled mechanism for preventing the closure of a circuit except by predetermined and authorized operation of a suitable circuit controlling mechanism.

Other objects and advantages of the present invention will appear more fully from the following detailed description, which, taken in conjunction with the accompanying drawings, will disclose to those skilled in the art the particular construction and operation of a preferred form of my invention.

In the drawings:

Figure 1 is a perspective view through a portion of an automotive vehicle, showing the relative positioning of the circuit controlling means of the present invention with reference to the related portions of the vehicle;

Figure 2 is a vertical sectional view through the distributor cap shown in Figure 1;

Figure 3 is a sectional view taken substantially on line 3—3, looking in the direction indicated by the arrow;

Figure 4 is a sectional view taken substantially on line 4—4 of Figure 2;

Figure 5 is a fragmentary view, partly in section, of a modified form of construction;

Figure 6 is a sectional view taken substantially on line 6—6 of Figure 2; and

Figure 7 is an elevational view of a modified form of distributor cap, with a portion thereof being broken away to illustrate the interior of the actuating portion of the cap.

Referring now in detail to Figure 1, I have disclosed an automotive vehicle having an engine 5, connected through a suitable transmission 6 to the drive shaft of the vehicle, the steering wheel of the vehicle being indicated at 7. The engine 5 is provided with a distributor 8, having a distributor cap 9 mounted thereon carrying a plurality of terminal plugs to which are connected conductors 10 extending through suitable distribution manifolds 12 to the respective spark plugs for the cylinders of the engine.

The steering post 13 has clamped thereto an actuating mechanism 14 comprising a dial portion 15 and a rotatable dialing member 16, provided with a pointer movable over the dial portion 15 of the member 14. A suitable switch 17 is provided for the purpose of actuating a light or similar means to provide for illumination of the dial portion 15 of the member 14, and for connecting the battery to an ignition coil. Extending from the rear portion of the dialing mechanism 14 is a flexible cable member 18, which may be a metallic tightly wound cable capable of transmitting rotative movement imparted thereto at the mechanism 14 through the cowl board 19 of the vehicle and into the proper portion of the distributor cap, as will be described in detail later.

Referring now in detail to the construction of the distributor cap 9, as shown in Figures 2, 3 and 4, this cap comprises a substantially inverted cup-shaped member having the depending flanged portion 22 seating upon the top of the distributor 8, and provided, adjacent its periphery, with a plurality of distributor contact studs 23 extending out through suitable individual integral bosses 24 to which are connected conductors 25 leading to the various spark plugs of the engine 5. The cap 9, together with the bosses 24, is formed of insulating material, being preferably molded from a phenol condensation product, hard rubber or the like.

Within the ring of projecting bosses 24 there is provided an upwardly extending integral substantially cylindrical flange portion 26, forming a cylindrical socket into which the circuit controlling means of the present invention is adapted to be inserted and cemented into position. Disposed substantially centrally within the socket formed by the flange 26 is an upwardly extending boss member 27, which surrounds a suitable terminal stud 28 extending through the cap 9 into the internally recessed portion thereof, and being provided with a contact tip portion 29 adapted to be engaged by the spring contact carried by rotatable distributor arm.

The circuit controlling means comprises a substantially cylindrical housing member 30, formed of insulating material, and having an annular recess 32 extending substantially centrally therethrough, the recess 32 being enlarged adjacent the lower end of the member 30 to provide a shoulder portion 33 adapted to receive an insulating disc member 34, secured within the housing 30 against the shoulder 33. The member 34 is provided with a contact stud 35 embedded in the lower surface thereof, the stud 35 being connected through the terminal 36 to a suitable terminal screw 37 carried within a projecting recessed boss 38 formed integral with the housing 30 and adapted to receive the high tension conductor 39 leading from the induction coil to the distributor. The high tension conductor 39 is provided with a contact sleeve or cap member 40 at its end, adapted to have seating engagement within the recess boss 38 for effecting positive contact with the end of screw 37, whereby the conductor 39 is placed in electrical contact with the contact stud 35. Obviously the conductor 39 may be connected in any desired manner to the contact 35.

At its lower end, the member 30 is adapted to receive a closure member 42, which is engaged within the socket formed by the flange 26, and is secured to the lower end of the member 30 by means of a plurality of cap screw members 43 threading into suitably threaded sockets 44 formed in the lower annular periphery of the member 30. The screws 43 are preferably countersunk inwardly of the lower planar surface of the member 42, whereby the member has insulating seating engagement against the bottom wall of the socket formed by the flange 26. The member 42 is also preferably provided with a recessed portion receiving the boss 27 of the cap 9, and is provided with an extending boss portion 45 having keying engagement within the opening at the lower end of the member 30. Suitable gasket means are preferably provided between the member 42 and the lower end of housing 30 to seal the interior of the housing 30 against leakage of insulating oil outwardly of the housing.

A contact stud 46 is mounted in the upper planar surface of the boss portion 45 of the member 42, and is provided with a terminal connection 47 extending into an annular recess formed in the member 42 above the boss 27. A suitable resiliently mounted contact member 48 is adapted to have contact engagement with the extending portion of the terminal 47, the member 48 being supported in a recess 49 formed in the upper end of the contact terminal stud 28.

The contact 46 is thereby electrically connected through the terminal 47 and resilient contact member 48 to the terminal stud 28 carried by the cap member 9. The resilient mounting of the terminal 48 provides for practically universal contacting engagement of the contact 48 against the terminal wire 47, and assures that positive electrical connection therebetween will be secured.

Extending centrally through the cylindrical housing member 30 is a rotatable shaft 50, which at its lower end is suitably supported in a recessed bearing portion formed in the upper planar surface of the boss 45 of the member 42, and at its upper end is carried within a bearing collar 52 mounted upon the upper end of the housing 30 by means of a pair of extending shoulder members 53 secured against the top of a pair of cylindrical collar members 54 by means of a pair of cap screws 55 threading into suitable openings 56 formed in the upper annular surface of the member 30. A packing bushing 57 is mounted in the upper end of the annular bore 32 of the member 30, and is provided with an inwardly extending lower flanged portion serving as an additional bearing for the shaft 50. Packing 58 is disposed within the bushing 57, and is maintained in sealing engagement with the lateral surface of the shaft by means of the packing gland nut 59 threading into the gland or bushing 57. The shaft 50 is provided with a pair of integral annularly extending flanged collars 60 and 62.

These collars 60 and 62 are spaced a predetermined distance apart on the shaft 50, and are adapted to extend into suitable recesses 63 formed in a pair of cylindrical insulating disc members 64 and 65 mounted within the lower portion of the opening 32 of the housing 30.

Each of the collars 60 and 62 is provided with a portion of reduced diameter adapted to be frictionally secured to the shaft by means of set screw members or the like, although these members may be soldered into position, if desired. The extending flanged portions of the collars 60 and 62 are provided with pins 66 adapted to carry pawls 67 and 68, respectively, the pawls extending in opposite directions.

The recesses 63 formed in the members 64 and 65 are provided with cylindrical defining walls, each of the walls of the recess being provided with a suitably notched portion such as shown at 69 in Figure 4 for the purpose of receiving the ends of the pawls 67 and 68, whereby the shaft 50 is keyed to the members 64 and 65 for effecting rotation of these members upon rotation of the shaft.

The enlarged portions of the collars 60 and 62 are also provided with spring members 70 normally urging the pawls 67 and 68 into engagement with the notches 69 formed in the lateral defining walls of the recesses 63. It will be noted that the pawls 68 and 67 extend in opposite directions, whereby rotation of the shaft 50 in a clockwise direction, as viewed in Figures 3 and 4, will result in rotation of the member 65, while allowing the pawl 67 to slide about the defining wall of the recess 63 without in any way effecting rotation of the member 64. However, when the shaft 50 is rotated in a counterclockwise direction, the pawl 68 becomes disengaged from the notch 69, while the pawl 67 moves into engagement within the corresponding notch 69 formed in the member 64, and produces corresponding rotation of the member 64 while the member 65 remains in stationary position. Thus it will be apparent that it is necessary for the shaft 50 to be rotated at least more than one revolution in either direction before positive rotation of each of the members 64 and 65 is produced.

The members 64 and 65 are provided with axially extending contact members, comprising contact caps 72 separated and urged outwardly of the end surfaces of the members by means of intermediate spring members 73.

The upper cap member 72 of the rotatable cylindrical disc 64 is adapted, when the member 64 is rotated to the proper angular position, to move into wiping engagement with the contact 35 connected to the high tension cable 39. The lower contact member 72, which, if desired, may be a fixed contact plug set into the lower end surface of the member 64, is then fixed in a predetermined position within the housing 30. By rotation of the shaft 50 in the opposite direction, the member 65 is rotated to bring the upper contact cap 72 thereof into engagement with the lower contact stud 72 of the member 64. The lower contact cap 72 of member 65 is then in a position so that it engages the contact 46 leading to the central terminal stud 28 of the cap member 9. If desired, the upper surface of the member 65 may be provided with an arcuate bridging member whereby the two members 64 and 65 need not be positioned in exact vertical alignment in order to effect contact therebetween, the lower cap member 72 of the member 64 engaging a bridging member leading around the annular surface of the member 65 and providing engagement with the upper cap member 72 of the member 65. The contacts may extend angularly through the members 64 and 65, if desired. It is obvious that the particular cooperating arrangement of the contacts may be varied as desired, the contact 35 being adapted to be disposed anywhere upon the annular periphery of the member 34, while the contact 46 may be disposed at any point upon the upper surface of the boss 45 of the member 42. Any desired combination of movement or rotation of the shaft 50 may be employed in order to provide for producing electrical contact from the contact 35 through the members 64 and 65 to the contact 46 of the terminal stud 28.

The members 64 and 65 are provided, at their lateral surface, with spring pressed plungers preferably comprising felt washers 76 having bearing engagement against the internal periphery of the opening extending through the housing 30, the washers 76 being pressed outwardly by means of spring members and spring followers seated within suitable recesses extending radially into the lateral periphery of the members 64 and 65. A plurality of such guiding and cushioning members are provided in each of the members 64 and 65, and serve to frictionally hold the members against rotation when the shaft is being rotated in a direction opposite to that adapted to effect rotation of the particular member 64 or 65, and serve also to cushion the members 64 and 65 so that no binding will occur during their rotation within the cylindrical opening in the housing 30.

The upper end of the shaft 50 is provided with a groove or kerf 77, which is adapted to be engaged by a suitable tongue 78 carried by the end portion 79 of the flexible rotation transmitting member 18, which extends into the upper end of the sleeve member 52, and is secured against outward displacement therefrom by means of a pair of set screws 80. In this manner, operation of the control knob 16 at the member 14 on the steering post will produce rotation of the member 18, thereby correspondingly rotating the shaft 50 to effect selective rotation of the members 64 and 65 thereby moving the members 64 and 65 into the desired pre-selected position whereby contact is effective from the high tension conductor 39 to the terminal stud 28 of the distributor cap 9. The lower portion of the opening in housing 30 containing members 64 and 65 is preferably filled with insulating oil, because of the high voltage across the contacts 35 and 46. The member 42 and packing 58 effectively prevent leakage of oil out of this opening.

In Figure 5, I have disclosed a modified form of housing 30', in which the inwardly extending closure flange 34' is formed integral with the housing. The flange 34' carries a contact 35' connected through contact screw 37' to the high tension conductor extending into the socket 38'. The shaft 50 extends through a packing gland bushing 57' carried by the flange 34', and suitable packing 58' is disposed about the shaft and maintained in sealing engagement therewith by the packing nut 59'. This nut 59' is provided with an integral sleeve serving as a support for the flexible rotatable cable 18. A suitable cover 61 may be disposed over the upper end of housing 30', if desired, and secured in position by means of screws 71 threading into the upper end of the housing 30'.

Considering now in more detail the specific locking arrangement for securing the cap member 9 to the top of the distributor 8, as shown in detail in Figures 2 and 6, the upper end of the distributor 8 is provided with a metallic collar member 82, having depending flanged tabs 83 secured to the lateral wall of the distributor 8 by means of a plurality of rivets or other suitable securing means 84. The radially extending portion of the collar 82 is provided with a plurality of upwardly extending pin members 85, which are provided at their upper ends with headed portions 86. The pins are secured by welding, soldering or the like in fixed projecting position above the upper surface of the collar 82, and are provided at spaced intervals about the annular periphery of the collar. The collar 82 is also provided with a radially projecting sleeve portion 87, formed at one side thereof, as shown in more detail in Figure 5.

About the lower peripheral edge of the cap member 9, I provide a second collar member 88, secured to the lower end of the cap 9 by means of suitable securing means 89, comprising rivets, screws or the like. The collar 88 is thereby rigidly secured to the lower end of the cap member 9. The collar 88 is provided with a plurality of arcuately grooved portions 90, enlarged at one end, as shown at 92, for receiving the head end 86 of the pins 85. The cap 9 is therefore secured in position with the head end 86 of the pins extending into the enlarged portions 92 of the arcuate slot 90 of the collar 88. After the collar 88 has been moved downwardly about the shank of the pins, it is then rotated in a direction to move the pins 85 along the arcuate slots, whereby the headed portions 86 thereof bear upon the upper surface of the collar 88, to prevent relative separating movement between the cap 9 and the distributor 8.

The collar 88 is also provided, at one side thereof, with a lock member 93 having a headed pin 94 adapted to be locked therein. The diameter of the shank portion of the pin 94 is substantially the same as the internal diameter of the sleeve 87 of the collar 82, and when the collar 88 has been rotated sufficiently to lock the same to the collar 82 by means of the pin 85 having their headed ends extending over the defining edges of the slot 90, the pin 94 is inserted through the collar 87 and locked within the lock member 93 as shown in Figure 6. The lock member 93 is provided with a suitable key cylinder 95 for receiving a key to detach the pin 94 therefrom when it is desired to remove the distributor cap from the distributor 8.

It is thus apparent that the distributor cap is rigidly secured to the distributor 8 by the locking mechanism described, and cannot be pried loose therefrom without either opening the lock by means of the use of an authorized key, or prying off of the cap, which results in its destruction and necessitates entire rewiring of the system. The opening of the lock 93, while it permits removal of the distributor cap 9, still will not provide for operation of the device, since it would be necessary to reconnect an entirely new distributor cap and then connect the conductor 39 thereto before the motor could be operated. This requires time, and thus the quick getaway of a thief such as occurs frequently at present is prevented. Also, it is quite unlikely that a thief will carry a distributor cap assembly of this type, and be sufficiently skilled to connect the same properly for operation with the structure even if the cap 9 were destroyed and moved.

Referring now to the modification of the invention shown in Figure 7, I have provided a corresponding distributor cap 9, locked to the distributor 8 in the manner described, and provided with an upwardly extending substantially cylindrical flange portion 26 within which a suitable housing member 100 may be sealed by cementing the same in position or otherwise suitably securing it within the socket formed by the flange 26. The housing 100, in its essential details of construction, is substantially similar to the housing 30 described in Figure 2, except that the upper end of the shaft 50 terminates within the opening 32' of the housing, and is provided with a bevel gear 102 keyed thereto in any suitable manner. The gear 102 is adapted to be engaged by a second gear 103 carried upon a shaft 104 mounted in suitable bearings 105 formed in opposite side walls of the housing 100. The shaft 104 is connected, through the universal coupling connection 106, to a rotatable actuating rod 107, which is connected through the couplings 108 and 109 to a suitable actuator 110 mounted upon the dash board of a vehicle or the like. Rotation of the actuator 110 thereby produces corresponding rotation of the shaft 50' through the gears 103 and 102, and the locking mechanism described in detail in connection with Figure 2 can be correspondingly operated in this manner. The housing 100 is provided with the laterally extending boss 112 adapted to receive the high tension conductor 39 leading from the induction coil of the vehicle, and rotatable cylindrical members, such as members 64 and 65 of Figure 2, mounted within the housing and operated by the shaft 50' for the purpose of effecting connection between the conductor 39 and the high tension contact terminal of the distributor.

In the operation of the invention, the actuating member, whether it be the member 14 of Figure 1, or member 110 of Figure 7, is rotated a predetermined distance in one direction of rotation, thereby causing the rotation of one of the corresponding members 64 and 65 into a position such that it is connected to the contact 35 of the high tension conductor 39. This rotation may be produced by any desired rotatable coupling engagement to the shaft 50, and suitable dial indications will indicate the amount of rotation necessary for producing a predetermined positioning of the member 64. The dialing knob or actuating member is then rotated in the opposite direction to pick up the member 65 for rotation, while the member 64 remains in its set position, and upon a predetermined rotation of the member 65, contact is effected through the members 64 and 65 from contact 35 to the contact 46 leading to the high tension terminal stud of the distributor cap. It is obvious that the angular positions of the members 64 and 65 may be varied to provide for corresponding infinite variations of combinations necessary to produce the circuit connecting positions. Similarly, the positioning of the contacts 35 and 46 may be similarly varied to produce still further infinite varieties of combinations for such circuit controlling means.

It is believed obvious, therefore, that I have provided a circuit controlling means having locking mechanism therein which can be varied to provide any desired sequence or combination of movements to produce positive locking of the ignition circuit, thereby preventing operation of the vehicle except when the proper combination of movements is produced by one knowing the combination of the locking structure for the circuit controlling mechanism. This removes any of the dangers and disadvantages of having key controlled locks, and at the same time provides for opening and closing of the ignition system without the necessity of operating a key controlled lock in any manner. At the same time, the combination cannot be effectively determined by a thief, inasmuch as he would not know when the circuit was connected, and would necessarily have to maintain the starter motor energized while he was trying various combinations of movements. This would quickly deenergize the battery of the vehicle, and would thus prevent him from operating the motor even if he finally did arrive at the proper combination, which would be merely by luck.

If the thief broke off the distributor cap 9, or similarly removed it from the distributor 8, in order to remove the circuit controlling means from the vehicle, he still could not operate the vehicle since it would require the provision of a new distributor cap, some provision for locking the same to the distributor, and entire rewiring of the ignition system prior to an attempt to start the vehicle. Such an operation would require such a length of time that it would not be attempted under ordinary circumstances. It is therefore believed apparent that I have provided a locking circuit controlling means capable of advantageous use in any application where it is desired to eliminate the inherent disadvantages of key controlled operation, and at the same time to provide positive, yet simplified locking means for preventing unauthorized closing of an electrical circuit.

I do not intend to be limited to the exact details of construction which I have shown and described in the present application, but only in so far as defined by the scope and spirit of the appended claims.

I claim:

1. Circuit controlling means of the class described comprising a housing having a cylindrical passage therein, contacts in the end walls of said passage, a pair of rotatable insulating blocks in said passage, a shaft having means selectively engaging one of said blocks in each direction of rotation thereof, means for sealing said passage against the escape of insulating oil therefrom, and resilient contact means carried by said blocks and adapted to be moved into position to complete contact between said spaced contacts upon predetermined rotation of said shaft.

2. In circuit controlling means of the class described, a housing having a passageway therethrough, a pair of cylindrical insulating blocks in said passageway, a contact carried by said housing above said blocks, a closure member for the lower end of said opening secured to said housing, a contact carried by said closure member within said opening, a shaft extending through said blocks, means carried by said shaft for rotating one of said blocks in one direction and the other of said blocks in the opposite direction, contact means extending axially through each of said blocks, a remotely disposed rotatable actuating mechanism, and means for transmitting rotation of said mechanism to said shaft whereby predetermined rotation of said mechanism alines said blocks in position to establish contact between said contacts carried by said housing and said closure member, respectively.

3. In combination, a distributor cap having a central terminal stud therein, a cylindrical insulating housing carried by said cap and extending thereabove, a contact in the lower end of said housing engaging said terminal stud, a high tension conductor extending into the upper end of said housing and connected to a contact therein, a cylindrical passageway separating said contacts, block means in said passageway rotatable through a predetermined sequence of movements for completing a circuit between said contacts, remotely disposed means operable to effect said predetermined rotation of said block means, and key-controlled locking means for securing said cap in predetermined position upon a distributor.

4. In combination, a distributor cap, a cylindrical housing supported thereon, said housing having contact means receiving a high tension conductor, a pair of rotatable insulator blocks in said housing, a shaft extending through said blocks, means carried by said shaft for engaging one of said blocks for rotation in one direction and engaging the other of said blocks for rotation in the opposite direction, a contact engaged by the upper surface of one of said blocks and connected to said conductor, a contact engaged by the lower surface of the other of said blocks, and means carried by said blocks for completing a circuit between said contacts upon predetermined rotation of said blocks in opposite directions.

JOSEPH W. BICKEL.